Dec. 11, 1962   T. A. RICH   3,067,614
APPARATUS FOR INDICATING PRESSURE IN FLUID SYSTEM
Filed June 24, 1959
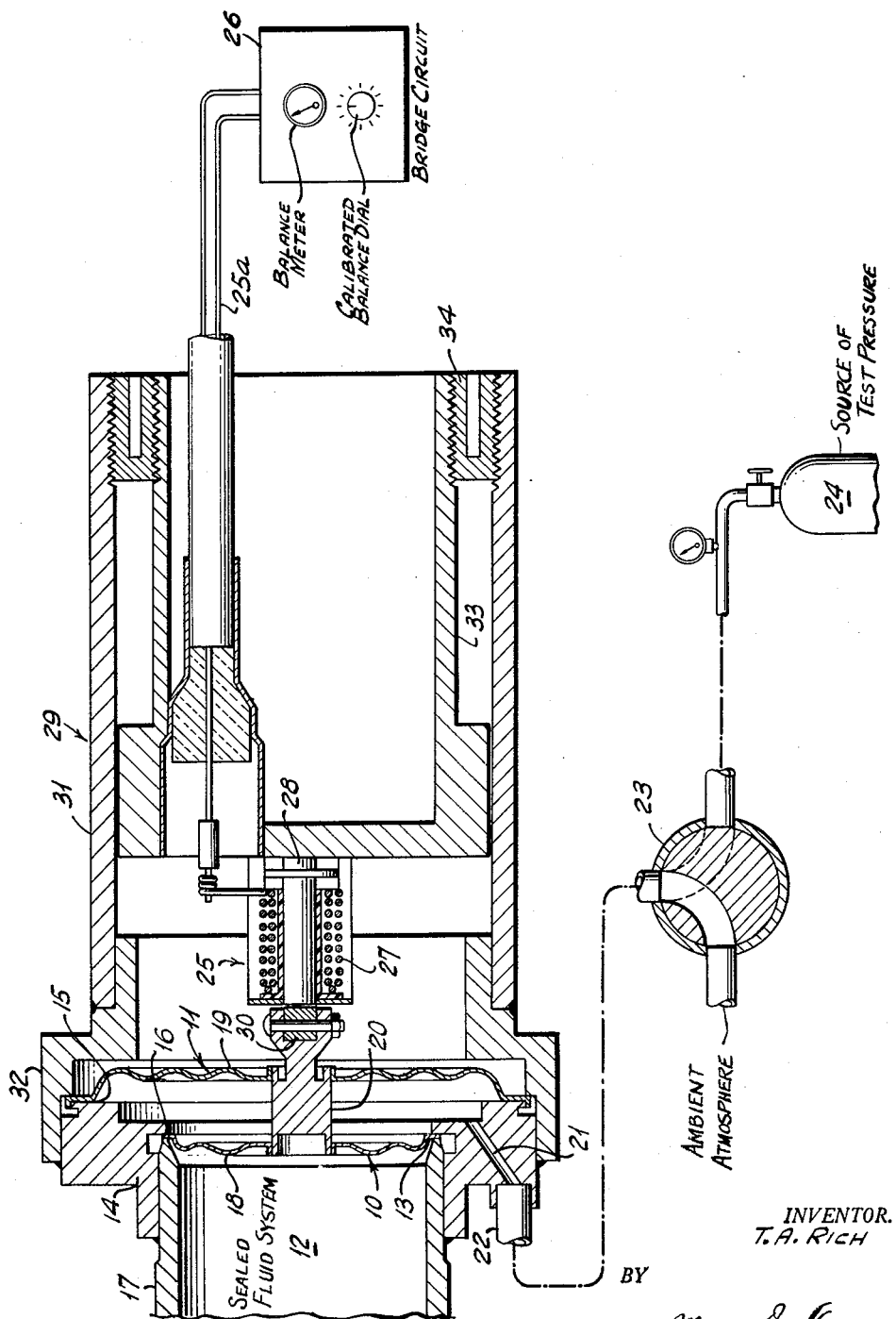
INVENTOR.
T. A. RICH
BY Max A. Farmer
ATTORNEYS

United States Patent Office 3,067,614
Patented Dec. 11, 1962

3,067,614
APPARATUS FOR INDICATING PRESSURE IN FLUID SYSTEM
Theodore A. Rich, Scotia, N.Y., assignor, by mesne assignments, to the United States of America as represented by the Secretary of the Navy
Filed June 24, 1959, Ser. No. 822,703
1 Claim. (Cl. 73—398)

This invention relates to an improved apparatus for indicating pressure in a permanently sealed fluid system and more particularly to an apparatus of this type which may be recalibrated in place in the fluid system, without disturbing its fluid-tight integrity.

In fluid systems where the fluid has corrosive, toxic, or other dangerous properties, it is essential that the system remain fluid tight. However, it is necessary to periodically recalibrate the system's pressure indicating apparatus especially if the system fluid is subjected to a substantial range of temperatures and pressures.

An object of this invention is to provide an improved pressure indicating apparatus for use in a permanently sealed fluid system containing fluid with dangerous properties, which system must remain sealed continuously.

A further object is to provide pressure indicating apparatus in accordance with the preceding object which may be recalibrated without removal from the system and without disturbing the fluid tight integrity of the system.

Other objects and many of the attendant advantages of this invention will be readily appreciated as the same becomes better understood by reference to the following detailed description when considered in connection with the accompanying drawing wherein:

The single FIGURE illustrates an embodiment of this invention, including a longitudinal section taken through its pressure sensing device, and other elements in electrical, and mechanical schematic.

In its broader aspects, the invention comprises a pair of diaphragms anchored in spaced apart face-to-face relation and each diaphragm including within the area defined by its anchorage, an elastic portion which is deflectable in a direction normal to the diaphragms when there is a difference in pressure on its opposite faces. The deflectable elastic portions of the two diaphragms have the same modulus of elasticity which remains substantially constant over the deflection range of the invention but are unequal in area. The centers of the areas of the deflectable elastic portions of the diaphragms are in a line normal to the diaphragms and are rigidly joined for movement together. The outwardly directed face of the diaphragm with the smaller deflectable elastic portion is subjected to the pressure of the fluid in the system. The outwardly directed face of the diaphragm with the larger deflectable elastic portion is subjected to a relatively low reference pressure, e.g., ambient atmospheric pressure. The inwardly directed faces of the two deflectable elastic portions are selectively subjected either to the reference pressure during which time the invention is able to indicate the pressure in the system, or to test pressures ranging downward from a level which is comparable in order of magnitude, to the pressure high in the fluid system, for calibration. Calibration test pressures are established only when the pressure in the fluid system is substantially equal to the reference pressure. Periodic recalibration is essential where, for example, high temperature operation could result in creep in the diaphragms. When the diaphragms are subjected to a test pressure as above the deflection of the centers of the elastic portions of the diaphragms will be the same as the deflection that will result if the pressure in the fluid system is made equal to that test pressure multiplied by a factor equal to Area of larger elastic portion—
$$\frac{\text{Area of smaller elastic portion}}{\text{Area of smaller elastic portion}}$$

If the larger elastic portion has twice the area of the smaller elastic portion, the deflection due to a selected test pressure established between the diaphragms is the same as the deflection the diaphragms would experience under the same pressure in the fluid system. A deflection measuring device is supported adjacent to the center of the elastic portion of the diaphragm 11. When the apparatus is manufactured, it is calibrated. Then it is permanently sealed to the fluid system, before the system fluid is added. After the system is in operation for a predetermined period of time, calibration is checked for any deviation. Recalibration is carried out when the pressure in the system is substantially the same as the reference pressure. Then the pressure between the diaphragms is selectively adjusted to several different levels and the resultant deflection is measured through the use of the bridge circuit. The diaphragms and their supporting apparatus are not touched. Recalibration is carried out with the apparatus in place in the fluid system. The integrity of the fluid system is not disturbed by recalibration. In a liquid metal system, as in a nuclear reactor, the pressure indicating apparatus needs to be recalibrated in place because all joints in the system are welded to ensure fluid tightness.

This disclosed embodiment of the invention includes a pair of circular diaphragms 10 and 11. The diaphragm 10 is anchored to and seals an opening in the fluid system 12 with one face exposed to the fluid in the system; diaphragm 10 forms a continuous circular seal 13 with conduit 17. The second diaphragm 11 is anchored to a circular flange-like element 14 and forms a continuous circular seal 15 therewith, which forms a continuous circular seal 16 with diaphragm 10 and which is anchored to conduit 17 of the fluid system. The diaphragms 10 and 11 are spaced apart, face-to-face and include elastic portions 18 and 19 respectively that are deflectable in a direction normal to the diaphragms. The modulus of elasticity is the same for elastic portions 18 and 19 and the diaphragm material is selected so that the modulus of elasticity is substantially constant over the deflection range. The centers of the deflectable elastic portions 18, 19 are in a line normal to the diaphragms and are securely joined by a rigid center post 20. There is a fluid tight seal between the center post and each of the two diaphragms. The outwardly directed face of diaphragm 11 is exposed to the ambient atmosphere.

The circular flange-like element 14 is formed with a fluid passage 21. A tube 22 connects the passage 21 to a two position valve 23; in the position shown on the drawing, the valve vents the space bounded by the diaphragms and the flange-like sleeve 14 to the ambient atmosphere and in the other position of the valve, that space is exposed to a source of selectively variable test pressure 24.

A variable inductance 25 connected by leads 25a to a bridge circuit 26 is provided for indicating the amount of deflection. The variable inductance includes a coil 27 and core 28 secured relative to the anchorage of the diaphragms by a temperature compensating structure 29, and an armature 30 secured to the center post 20. As the armature 30 is moved toward or away from the core 27, the reluctance of the coil flux path is changed. The bridge circuit balance dial is calibrated in terms of the gap between the core 28 and armature 30. When the apparatus is installed, the pressure in the fluid system equals ambient pressure. The initial gap is large, since increasing pressure increases deflection, reducing the gap. The dial may be further calibrated in terms of deflection relative to the initial gap setting.

The temperature compensating structure 28 is provided to compensate for variation in modulus of elasticity of the diaphragms, which gets smaller as the temperature rises resulting in a greater deflection for a given pressure at increased temperature. It includes an outer sleeve 31 affixed by coupling element 32 to flange-like member 14 and an inner sleeve 33 slidably fitting inside the outer sleeve and joined to the outer sleeve by a ring 34; the ring may be gripped and turned by a spanner wrench and threadedly engages the adjacent ends of the two sleeves. The sleeve materials are of different coefficients of expansion. The relative lengths of the high and low expansion material and the gap between core 28 and armature 30 are adjusted by threaded ring 31 until the necessary temperature compensation is achieved and then is immovably affixed, as by welding to both sleeves. The other parts are secured together by welding or the like to ensure good fluid seal.

When a measurement is made the balance dial of the bridge circuit is adjusted to zero the meter. Then the position of the dial is noted. An alarm, not shown, may be operated by a relay in series with the meter whereby if the meter current exceeds a predetermined amount, the alarm will warn the operator of impending danger.

Obviously many modifications and variations of the present invention are possible in the light of the above teachings. It is therefore to be understood that within the scope of the appended claim the invention may be practiced otherwise than as specifically described.

I claim:

Apparatus for indicating pressure in a fluid pressure system which comprises a pair of diaphragms, means hermetically sealed to the perimeters of both diaphragms and anchoring said diaphragms in spaced apart face-to-face relation and leaving their outer faces exposed and together with said diaphragms confining a chamber therewithin, said means having a fluid passage extending from the chamber to the exterior thereof, means joined to said passage for selectively establishing selected test pressures in said chamber and for selectively venting said chamber to a reference pressure, each diaphragm including within its anchorage an elastic portion which is deflectable in a direction normal to the faces of the diaphragms, the centers of said elastic portions of said two diaphragms being in a line normal to the faces of said diaphragms, means rigidly connecting the centers of said elastic portions of said diaphragms for movement together, the area of the larger elastic portion being twice that of the smaller elastic portion, means for applying the pressure in said fluid system to that face of the smaller elastic diaphragm portion remote from the other diaphragm, a pair of coaxial cylindrical members of unequal lengths having different temperature coefficients of expansion, the shorter cylindrical member nested within the longer member, one end of each member secured together in contiguous relationship, the other end of the longer cylindrical member secured to the anchorage of said diaphragms in line with the centers of the elastic portions, an inductance coil element having a magnetic core and a magnetic element in line with, adjacent to but spaced from one end of the inductance coil whereby the inductance of said coil is a function of the spacing between said elements, one of said elements secured to the centers of said elastic portions of said diaphragms, the other of said elements secured to the other end of the shorter of the cylindrical members, said cylindrical members having temperature coefficients of expansion for automatically adjusting the spacing between said elements as a function of temperature for compensating changes in elasticity of said diaphragm portions with temperature, and whereby when the pressure on the remote faces of said diaphragms is substantially equal to said reference pressure and a selected test pressure substantially greater than the reference pressure is established in said chamber, the centers of said elastic portions will deflect in a direction going from the smaller diaphragm to the larger diaphragm and the amplitude of the deflection will be substantially the same as the deflection that would result if the pressure on the remote face of the smaller diaphragm were made equal to the test pressure and the remaining faces of the two diaphragms were exposed to said reference pressure.

References Cited in the file of this patent

UNITED STATES PATENTS

| | | |
|---|---|---|
| 1,559,063 | Becker | Oct. 27, 1925 |
| 2,627,183 | Greenwood et al. | Feb. 3, 1953 |
| 2,692,501 | Erwood | Oct. 26, 1954 |
| 2,883,995 | Bialous et al. | Apr. 28, 1959 |
| 2,932,807 | Bourns | Apr. 12, 1960 |